US012746418B2

(12) United States Patent
Carter

(10) Patent No.: US 12,746,418 B2
(45) **Date of Patent: *Sep. 29, 2026**

(54) VENTED SAFETY CABINET WITH THERMALLY-ACTUATED DAMPER

(71) Applicant: Justrite Manufacturing Company, LLC, Deerfield, IL (US)

(72) Inventor: Glen A. Carter, Mattoon, IL (US)

(73) Assignee: Justrite Manufacturing Company, LLC., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,937

(22) Filed: Apr. 15, 2024

(65) Prior Publication Data

US 2024/0261605 A1 Aug. 8, 2024

Related U.S. Application Data

(60) Continuation of application No. 16/893,057, filed on Jun. 4, 2020, now Pat. No. 11,957,942, which is a (Continued)

(51) Int. Cl.
*A62C 2/24* (2006.01)
*A62C 2/06* (2006.01)
(Continued)

(52) U.S. Cl.
CPC ................ *A62C 2/242* (2013.01); *A62C 2/12* (2013.01); *E05C 1/14* (2013.01); *F16K 17/383* (2013.01);
(Continued)

(58) Field of Classification Search
CPC ......... A62C 2/242; A62C 2/12; F16K 17/383; F16K 17/386; F24F 7/10; F24F 13/10
(Continued)

(56) References Cited

U.S. PATENT DOCUMENTS 2,998,018 A 8/1961 Beck et al.
3,151,688 A 10/1964 Young
(Continued)

FOREIGN PATENT DOCUMENTS

CA 1116921 A * 1/1982 ............... A62C 3/14
CN 101608703 A 12/2009
(Continued)

OTHER PUBLICATIONS

U.S. Appl. No. 16/893,057, filed Jun. 4, 2020.
(Continued)

*Primary Examiner* — Michael G Hoang
*Assistant Examiner* — Frances F. Hamilton
(74) *Attorney, Agent, or Firm* — Leydig, Voit & Mayer, Ltd.

(57) ABSTRACT

A safety cabinet includes an enclosure and at least one door to selectively seal the enclosure. The safety cabinet can be used to store, for example, flammable liquids, flammable waste, corrosives, pesticides, or combustible waste. The safety cabinet incorporates a thermally-actuated damper that includes a body, a valve plate, and a pivot assembly. The valve plate is disposed within the passage of the body such that the valve plate is movable between an open position and a closed position. The pivot assembly includes a biasing system adapted to bias the valve plate to the closed position and a fusible link interconnected between the body and the biasing system to constrain the valve plate from moving from the open position to the closed position. The fusible link is configured to melt at a predetermined temperature to thereby allow the biasing system to move the valve plate to the closed position.

6 Claims, 13 Drawing Sheets

Related U.S. Application Data division of application No. 15/688,626, filed on Aug. 28, 2017, now Pat. No. 10,695,598.

(51) Int. Cl.

| | |
|---|---|
| ***A62C 2/12*** | (2006.01) |
| ***E05C 1/14*** | (2006.01) |
| ***F16K 17/38*** | (2006.01) |
| ***F24F 13/10*** | (2006.01) |
| *A62C 3/06* | (2006.01) |
| *B01L 1/00* | (2006.01) |
| *E05B 65/10* | (2006.01) |
| *E05C 9/04* | (2006.01) |
| *E05C 9/18* | (2006.01) |
| *E05F 1/00* | (2006.01) |
| *E05F 1/08* | (2006.01) |
| *E05F 5/12* | (2006.01) |
| *F24F 7/10* | (2006.01) |

(52) U.S. Cl.

CPC ............ *F16K 17/386* (2013.01); *F24F 13/10* (2013.01); *A62C 3/06* (2013.01); *A62C 3/14* (2013.01); *B01L 1/50* (2013.01); *B01L 2200/082* (2013.01); *B01L 2400/0677* (2013.01); *E05B 65/104* (2013.01); *E05C 9/046* (2013.01); *E05C 9/1825* (2013.01); *E05F 1/006* (2013.01); *E05F 1/08* (2013.01); *E05F 5/12* (2013.01); *E05Y 2201/41* (2013.01); *E05Y 2201/686* (2013.01); *E05Y 2600/324* (2013.01); *E05Y 2800/342* (2013.01); *E05Y 2800/416* (2013.01); *E05Y 2900/21* (2013.01)

(58) Field of Classification Search

USPC .......................................................... 312/222

See application file for complete search history.

(56) References Cited

U.S. PATENT DOCUMENTS

| | | | | | |
|---|---|---|---|---|---|
| 3,174,495 | A | | 3/1965 | Anderson et al. | |
| 3,260,018 | A | * | 7/1966 | Schuh | A62C 2/14 292/345 |
| 3,537,518 | A | | 11/1970 | Sullivan et al. | |
| 3,720,153 | A | | 3/1973 | Jardinere et al. | |
| 3,747,618 | A | | 7/1973 | Boes | |
| 3,842,853 | A | | 10/1974 | Kelly et al. | |
| 3,862,641 | A | | 1/1975 | Follett | |
| 3,916,930 | A | | 11/1975 | Erickson | |
| 4,214,600 | A | | 7/1980 | Williams, Jr. et al. | |
| 4,220,172 | A | | 9/1980 | Stager | |
| 4,228,816 | A | | 10/1980 | Aoki | |
| 4,271,857 | A | | 6/1981 | Rowe | |
| 4,272,054 | A | | 6/1981 | Zinnai | |
| 4,273,148 | A | | 6/1981 | Charland | |
| 4,275,754 | A | | 6/1981 | Lyons et al. | |
| 4,301,569 | A | * | 11/1981 | McCabe | F24F 13/15 16/48.5 |
| 4,338,967 | A | * | 7/1982 | McCabe | A62C 2/14 251/280 |
| 4,345,738 | A | | 8/1982 | Ripert | |
| 4,366,830 | A | * | 1/1983 | Becelaere | F24F 13/1413 137/75 |
| 4,373,542 | A | | 2/1983 | Scaramucci | |
| 4,467,824 | A | | 8/1984 | Strulik | |
| 4,474,167 | A | * | 10/1984 | McCabe | F16K 17/386 292/DIG. 60 |
| 4,505,291 | A | | 3/1985 | Bruton | |
| 4,531,534 | A | * | 7/1985 | Magill | F03G 1/06 137/75 |
| 4,553,589 | A | | 11/1985 | Jennings et al. | |
| 4,559,867 | A | * | 12/1985 | Van Becelaere | F16K 1/221 137/75 |
| 4,562,853 | A | | 1/1986 | Tschirky et al. | |
| 4,671,308 | A | | 6/1987 | Williams et al. | |
| 4,811,752 | A | | 3/1989 | Lyons et al. | |
| 4,817,658 | A | | 4/1989 | Lyons | |
| 4,844,113 | A | | 7/1989 | Jones | |
| 4,936,287 | A | * | 6/1990 | Hart | F16K 17/383 137/75 |
| RE33,928 | E | | 5/1992 | Bryton et al. | |
| 5,201,336 | A | | 4/1993 | Taylor et al. | |
| 5,254,798 | A | | 10/1993 | Zoback | |
| 5,325,881 | A | | 7/1994 | Hunter et al. | |
| 5,540,250 | A | | 7/1996 | Mullins | |
| 5,562,118 | A | | 10/1996 | Cross | |
| 5,806,830 | A | * | 9/1998 | Alvarez | F16K 27/0218 251/145 |
| 5,813,739 | A | | 9/1998 | White | |
| 5,992,098 | A | | 11/1999 | Flider | |
| 6,158,520 | A | | 12/2000 | Reilly et al. | |
| 6,250,015 | B1 | | 6/2001 | Gillispie | |
| 6,250,326 | B1 | | 6/2001 | Kimball | |
| 6,470,905 | B2 | | 10/2002 | Im et al. | |
| 6,568,437 | B2 | | 5/2003 | Dean et al. | |
| 6,581,629 | B2 | | 6/2003 | Eielsen | |
| 7,185,668 | B2 | | 3/2007 | Ochi et al. | |
| 7,565,773 | B1 | | 7/2009 | Romig | |
| 7,845,575 | B2 | | 12/2010 | Franconi | |
| 8,051,915 | B2 | | 11/2011 | Blease et al. | |
| 8,146,674 | B2 | | 4/2012 | Lee | |
| 8,602,048 | B2 | | 12/2013 | Radford et al. | |
| 8,651,595 | B2 | | 2/2014 | Backhouse | |
| 9,057,453 | B2 | | 6/2015 | Pitchford et al. | |
| 9,089,727 | B1 | | 7/2015 | Flood | |
| 2002/0195140 | A1 | * | 12/2002 | Heil | F16K 1/223 137/75 |
| 2003/0001465 | A1 | | 1/2003 | Carter | |
| 2004/0058639 | A1 | * | 3/2004 | Perrin | F24F 13/1406 454/369 |
| 2004/0121722 | A1 | * | 6/2004 | Heil | F16K 17/386 454/369 |
| 2007/0017738 | A1 | * | 1/2007 | Truss | A62C 2/12 181/209 |
| 2007/0157977 | A1 | | 7/2007 | Dean | |
| 2007/0173192 | A1 | * | 7/2007 | Votaw | F24F 13/14 454/256 |
| 2007/0205703 | A1 | | 9/2007 | McLuckie et al. | |
| 2007/0236018 | A1 | * | 10/2007 | Husmann | F16L 37/252 285/391 |
| 2007/0289631 | A1 | * | 12/2007 | Higgins | F16K 27/07 137/75 |
| 2008/0264405 | A1 | * | 10/2008 | Van Becelaere | A62C 2/12 126/287.5 |
| 2009/0189102 | A1 | | 7/2009 | Linden | |
| 2010/0223773 | A1 | | 9/2010 | Florian | |
| 2011/0308825 | A1 | | 12/2011 | Lee | |
| 2012/0031634 | A1 | | 2/2012 | Lewinski et al. | |
| 2013/0029580 | A1 | | 1/2013 | Furrer et al. | |
| 2013/0146272 | A1 | | 6/2013 | Jackson | |
| 2013/0200767 | A1 | | 8/2013 | Mueller | |
| 2015/0174436 | A1 | | 6/2015 | Peel et al. | |
| 2015/0371513 | A1 | | 12/2015 | Stokes | |
| 2018/0003408 | A1 | | 1/2018 | Davis | |
| 2018/0264529 | A1 | | 9/2018 | Wang | |
| 2019/0060685 | A1 | * | 2/2019 | Carter | E05F 1/08 |

FOREIGN PATENT DOCUMENTS

| | | | | | |
|---|---|---|---|---|---|
| CN | 201513609 | U | | 6/2010 | |
| CN | 201973301 | U | | 9/2011 | |
| CN | 202052230 | U | | 11/2011 | |
| CN | 203571154 | U | | 4/2014 | |
| EP | 0447944 | A1 | * | 9/1991 | F24F 13/1406 |
| EP | 1038555 | A2 | * | 9/2000 | A62C 2/12 |
| EP | 2520837 | A1 | | 11/2012 | |
| ES | 2836250 | T3 | * | 6/2021 | F24F 11/745 |
| GB | 2369571 | A | * | 6/2002 | A62C 2/12 |
| GB | 2375045 | A | | 11/2002 | |

(56) References Cited

FOREIGN PATENT DOCUMENTS

| | | | |
|---|---|---|---|
| WO | WO 1994/27072 | A1 | 11/1994 |
| WO | WO 2006/021775 | A1 | 3/2006 |
| WO | WO 2009/029023 | A1 | 3/2009 |
| WO | WO 2014/202097 | A2 | 12/2014 |
| WO | WO 2017/054874 | A1 | 4/2017 |

OTHER PUBLICATIONS

U.S. Appl. No. 15/688,626, filed Aug. 28, 2017.

European Patent Office, International Search Report and Written Opinion in International Application No. PCT/US2018/015528 (May 11, 2018).

* cited by examiner 260
261
269
263
265
255

260
261
255
269
265
263

258
253
257

258
253
257

253

VENTED SAFETY CABINET WITH THERMALLY-ACTUATED DAMPER

CROSS-REFERENCE TO RELATED APPLICATIONS

This application is a continuation of U.S. patent application Ser. No. 16/893,057, filed Jun. 4, 2020, and entitled, “Vented Safety Cabinet with Thermally-Actuated Damper,” which, in turn, is a divisional of U.S. patent application Ser. No. 15/688,626, filed on Aug. 28, 2017, entitled, “Vented Safety Cabinet with Thermally-Actuated Damper,” now U.S. Pat. No. 10,695,598, issued Jun. 30, 2020, the entire disclosure of which are hereby incorporated by reference.

TECHNOLOGICAL FIELD

The present disclosure pertains generally to a safety cabinet for the safe storage of flammable, combustible, or other hazardous materials, and more particularly to a safety cabinet with a vent system having a thermally-actuated damper.

BACKGROUND

A safety cabinet can be used for the onsite storage of flammable material at a manufacturing plant, for example. The safety cabinet can be provided to insulate flammable material stored within it from the direct effects of an external fire to help prevent (for at least some designated period of time) the contents of the safety cabinet from themselves igniting and adding to the deleterious effect of the original fire.

Venting a safety cabinet is typically not necessary for fire protection. However, a user of a safety cabinet may desire to vent the safety cabinet, as according to either an applicable law or an internal standard operating procedure. Venting the safety cabinet can help, in some instances, reduce the amount of odorous, ignitable vapor and/or hazardous vapor emitted by the materials stored within the safety cabinet. In such cases, it is desirable for the venting system to be installed so as to avoid adversely affecting the intended performance of the cabinet during a fire. In practice, however, venting a safety cabinet can be hard to do without compromising its specified fire performance rating. In fact, a vented cabinet could compromise the ability of the cabinet to protect its contents from a fire. During a fire, vapor from the contents stored in the safety cabinet can be emitted. If the ventilation system compromises the integrity of the safety cabinet, these ignitable vapors can combust to further contribute to the fire’s destructive potential.

Previous safety cabinets have included a mechanism for closing the venting system that is thermally-activated. However, such conventional mechanisms can be very expensive.

There is a continued need in the art to provide additional solutions to enhance the venting of a safety cabinet. For example, there is a continued need for techniques for venting a safety cabinet using equipment that is economical and that can help maintain the performance of the safety cabinet in the event of a fire.

It will be appreciated that this background description has been created by the inventor to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In one embodiment, a safety cabinet includes an enclosure, a door, and a vent system with a thermally-actuated damper. The enclosure defines an interior, an opening, and a vent port. The opening and the vent port are in communication with the interior of the enclosure. The door is rotatably mounted to the enclosure and is moveable over a range of travel between an open position and a closed position. The door, when in the closed position, is adapted to cover at least a portion of the opening of the enclosure.

The vent system includes a conduit having an internal passage and a thermally-actuated damper. The conduit is connected to the enclosure such that the internal passage of the conduit is in communication with the vent port of the enclosure. The thermally-actuated damper includes a body, a valve plate, and a pivot assembly.

The body extends along a longitudinal axis and has a first end and a second end. The ends are disposed in spaced relationship to each other along the longitudinal axis. The body defines an internal passage with a first opening disposed at the first end and a second opening disposed at the second end. The body comprises a portion of the conduit such that the first end of the body is in communication with the vent port of the enclosure.

The valve plate is disposed within the passage of the body such that the valve plate is intermediately disposed along the longitudinal axis between the first end and the second end of the body. The valve plate is movable between an open position and a closed position. The valve plate permits air flow between the openings of the passage of the body when the valve plate is in the open position, and the valve plate substantially occludes the passage of the body when the valve plate is in the closed position.

The pivot assembly includes a biasing system and a fusible link. The biasing system is mounted to the body such that it acts upon the valve plate and is adapted to bias the valve plate to the closed position. The fusible link is interconnected between the body and the biasing system to form an interconnection therebetween such that the valve plate is disposed in the open position. The fusible link constrains the valve plate from moving from the open position to the closed position via the interconnection of the fusible link between the body and the biasing system. The fusible link is configured to melt at a predetermined temperature to thereby disengage the interconnection of the fusible link between the biasing system and the body and to thereby allow the biasing system to move the valve plate to the closed position.

In another embodiment, a damper for a vent system of a safety cabinet is provided. The damper includes a body, a valve plate, and a pivot assembly.

The body extends along a longitudinal axis and has a first end and a second end. The ends are disposed in spaced relationship to each other along the longitudinal axis. The body defines a passage with a first opening disposed at the first end and a second opening disposed at the second end.

The valve plate is disposed within the passage of the body such that the valve plate is intermediately disposed along the longitudinal axis between the first end and the second end of the body. The valve plate is movable between an open position and a closed position. The valve plate permits air flow between the openings of the passage of the body when the valve plate is in the open position, and the valve plate substantially occludes the passage of the body when the valve plate is in the closed position.

The pivot assembly includes a valve support assembly, a biasing system, and a fusible link. The valve support assembly is mounted to the body and the valve plate. The valve support assembly is adapted to support the valve plate such that the valve plate is movable between the open position and the closed position. The biasing system is mounted to the body and at least one of the valve plate and the valve support assembly. The biasing system is adapted to bias the valve plate to the closed position. The fusible link is interconnected between the body and the biasing system to form an interconnection therebetween such that the valve plate is disposed in the open position. The fusible link constrains the valve plate from moving from the open position to the closed position via the interconnection of the fusible link between the body and the biasing system. The fusible link is configured to melt at a predetermined temperature to thereby disengage the interconnection of the fusible link between the biasing system and the body and to thereby allow the biasing system to move the valve plate to the closed position.

Further and alternative aspects and features of the disclosed principles will be appreciated from the following detailed description and the accompanying drawings. As will be appreciated, the principles related to thermally-actuated dampers and safety cabinets disclosed herein are capable of being carried out in other and different embodiments, and capable of being modified in various respects. Accordingly, it is to be understood that the foregoing general description and the following detailed description is exemplary and explanatory only and does not restrict the scope of the disclosed principles.

Figure 1:
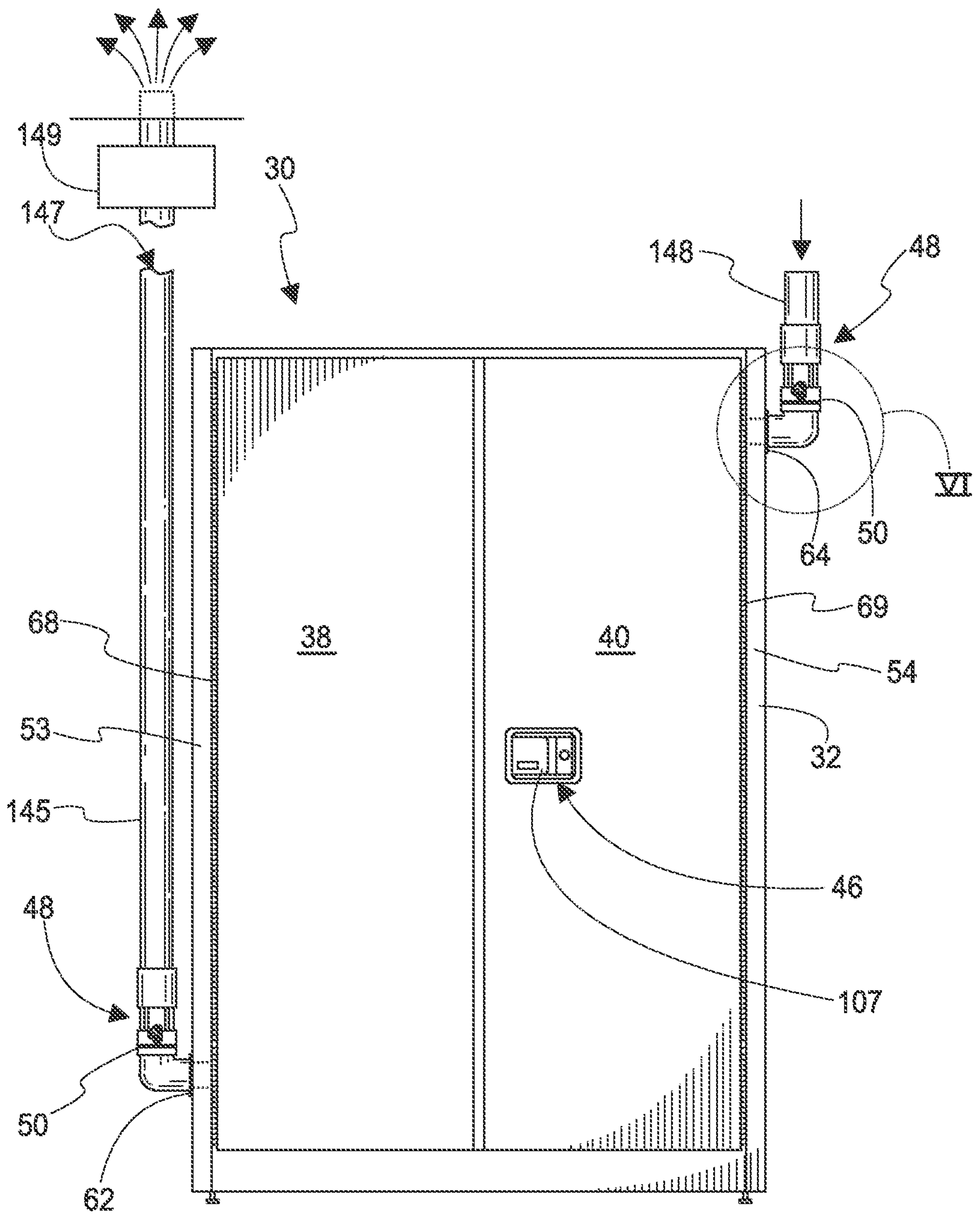
FIG. 1 is a front elevational view of an embodiment of a safety cabinet constructed in accordance with principles of the present disclosure, illustrating a pair of doors in a closed position.

It should be understood that the drawings are not necessarily to scale and that the disclosed embodiments are illustrated diagrammatically and in partial views. In certain instances, details which are not necessary for an understanding of this disclosure or which render other details difficult to perceive have been omitted. It should be understood that this disclosure is not limited to the particular embodiments illustrated herein.

DETAILED DESCRIPTION OF EXEMPLARY EMBODIMENTS

The present disclosure is directed to embodiments of a safety cabinet with a vent system having at least one thermally-actuated damper that operates in response to increased ambient temperature to place the vent system of the safety cabinet in a closed position to further protect the contents stored in the interior of the safety cabinet from exposure to open flame and/or increased temperature as a result of a fire in the vicinity of the safety cabinet. To help ensure that a venting system of a safety cabinet mechanically closes in the event of a fire, the present disclosure is directed to embodiments of a thermally-actuated damper adapted to close the vent system of the safety cabinet in the event ambient thermal conditions exceed a threshold level. In embodiments, the thermally-actuated damper includes a thermally-actuated fusible link (e.g., one rated for 135° F. or 165° F.) to release and close a valve plate of the damper in the event of thermal conditions that cause the link to melt. When the fusible link melts, a spring can act to close the valve plate against a valve seat defined in a body of the damper. In embodiments, a simple, economical spring-loaded butterfly type valve plate is provided to act as the shutoff damper.

In embodiments following principles of the present disclosure, the thermally-actuated damper includes a body made from stainless steel for enhanced resistance to corrosion and frictional sparking. In embodiments, the damper can include brass bushings and washers at pivot locations to help reduce corrosion and friction caused by parts moving relative to each other. In embodiments, the mass of the body and its valve seat and the valve plate can help increase the thermal barrier that inhibits the heat produced in a fire created on the outside of the cabinet from migrating to the inside of the safety cabinet.

In embodiments, a safety cabinet can include a pair of vent ports (such as, a low vent port and a high vent port, e.g.) which are in communication with the interior of the enclosure. The vent system can include conduit sections connected to the enclosure such that they are respectively in communication with the pair of vent ports. Each conduit section can have associated with it a thermally-actuated damper constructed according to principles of the present disclosure. In the event that a fire subjects the dampers of the safety cabinet to ambient temperatures that cause the respective fusible links to melt, the valve plate of each damper closes to stop the flow of air through the conduit sections either into or out of the enclosure of the safety cabinet.

In conventional vent systems, rigid metal conduit (such as, two-inch National Pipe Thread (NPT) pipe, for example) is used for the conduit sections. The rigid piping is typically used to help maintain the performance of a safety cabinet during a fire. In embodiments, a damper constructed according to principles of the present disclosure can be used in a way that eliminates the use of the rigid metal pipe of the vent system connected to the damper. In embodiments, the damper can include a coupling that is configured to be used with a plastic pipe (such as, a polyvinyl chloride (PVC) pipe, for example) while substantially maintaining the fire rating of the safety cabinet. In such situations, the mass of the body of the damper and the valve plate can act as a thermal barrier for the interior of the safety cabinet. In embodiments, alternate cabinet connections can be made to accommodate flexible tubing, duct work, etc.

Turning now to the Figures, an embodiment of a safety cabinet 30 constructed according to principles of the present disclosure is shown in FIG. 1. The safety cabinet 30 can be used to store flammable, combustible, or other hazardous materials.

Figure 2:
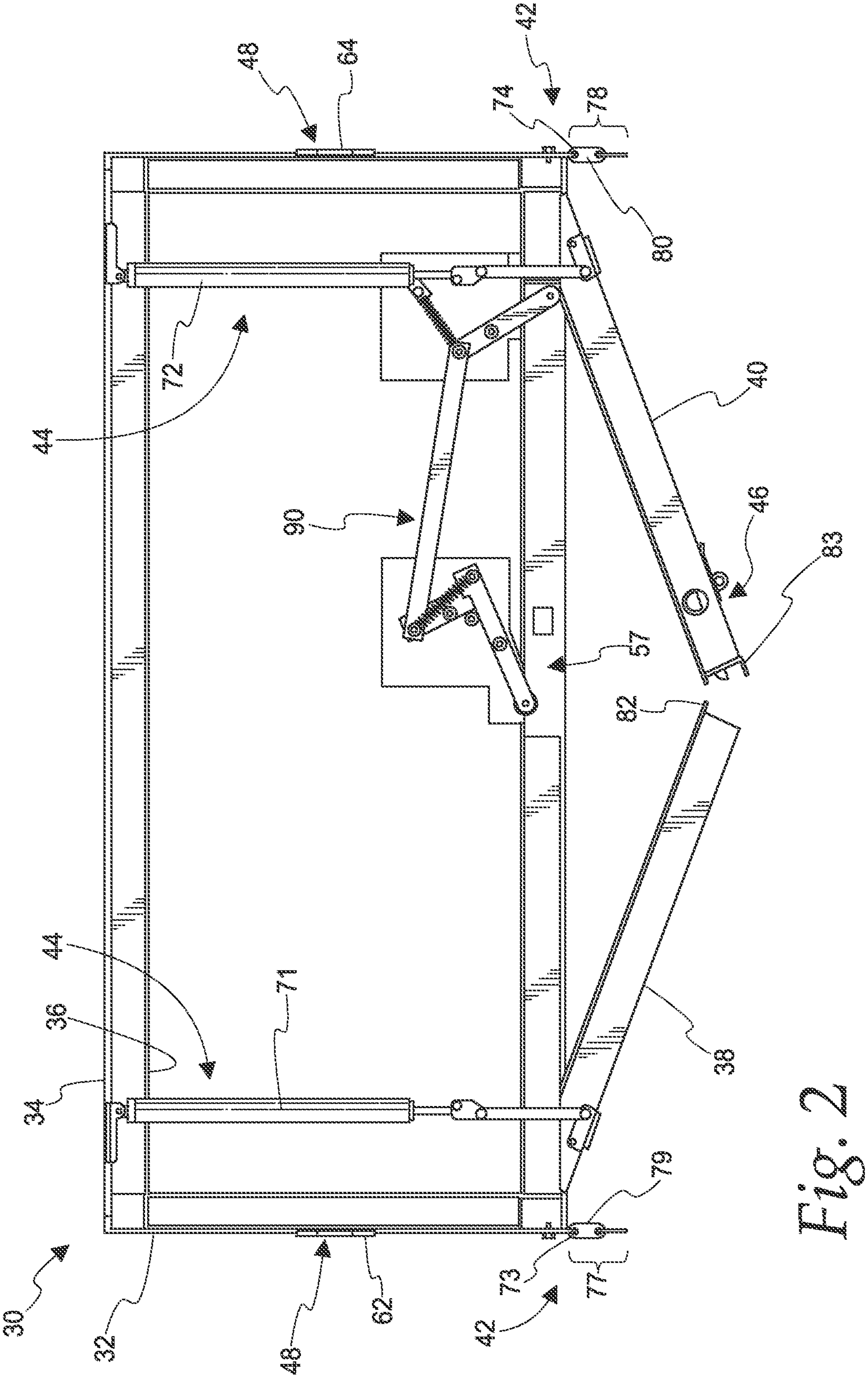
FIG. 2 is a top plan view of the safety cabinet of FIG. 1 with a top panel thereof removed for illustrative purposes.

In embodiments, the safety cabinet 30 includes an enclosure 30, at least one door 40, and a vent system 48 with at least one thermally-actuated damper 50 constructed according to principles of the present disclosure. Referring to FIGS. 1 and 2, in the illustrated embodiment, the safety cabinet 30 includes an enclosure 32, a pair of doors 38, 40, a retaining system 42 for retaining the doors 38, 40 in an open position (FIG. 2), a closure system 44 for automatically closing the doors 38, 40 so that they move from an open position (see, e.g., FIG. 2) to the closed position (see, e.g., FIG. 1), a latch system 46 for latching the doors 38, 40 in the closed position to cover the opening of the enclosure 32 (see FIGS. 3 and 4, as well), and a vent system 48 with a pair of thermally-actuated dampers 50 that are both constructed according to principles of the present disclosure. The safety cabinet 30 has a double-walled construction.

Referring to FIGS. 1 and 2, the safety cabinet 30 includes an enclosure 32 having an outer shell 34 and an inner shell 36, a left door 38, and a right door 40. The enclosure 32 includes the inner shell 36 to provide a double-walled construction, wherein each outer wall of the outer shell 34 has a corresponding inner wall of the inner shell 36, with the corresponding inner and the outer walls separated by a predetermined distance to define an insulative air space. The left and right doors 38, 40 each have a double-walled construction similar to the enclosure 32.

Figure 3:
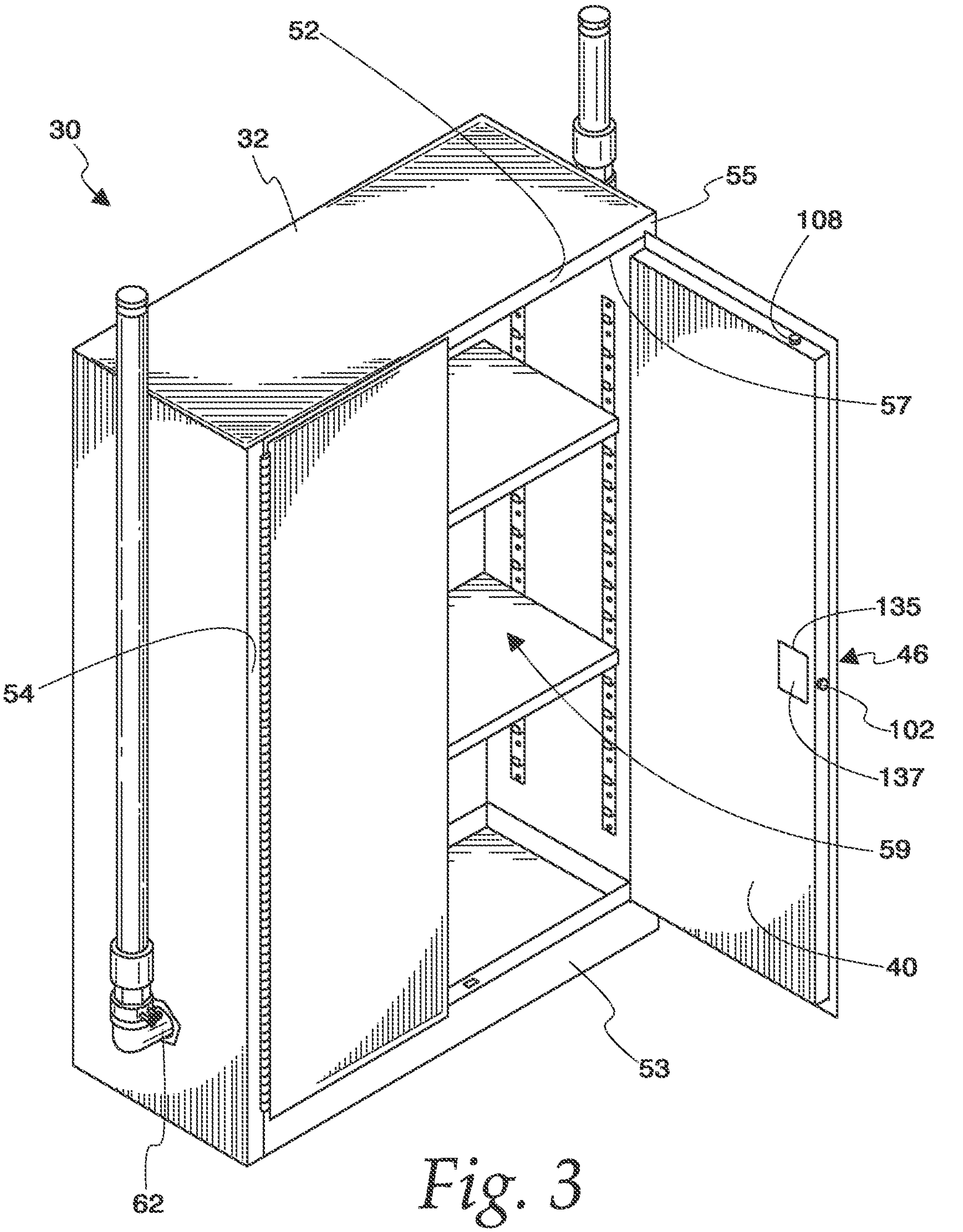
FIG. 3 is a perspective view of the safety cabinet of FIG. 1, illustrating the doors in an open position.

Referring to FIG. 3, the enclosure 32 also includes a top jamb 52, a bottom jamb 53, a left jamb 54, and a right jamb 55. The jambs 52, 53, 54, 55 of the enclosure 32 bound and define an opening 57 to an interior 59 defined by the enclosure 32. The opening 59 is in communication with the interior 59 of the enclosure 32.

Referring to FIGS. 1-3, in embodiments, the enclosure 32 defines at least one vent port 62 that is in communication with the interior 59 of the enclosure 32. In the illustrated embodiment, the enclosure 32 defines a pair of vent ports 62, 64 that extend through both the outer shell 43 and the inner shell 36 such that the vent ports 62, 64 permit communication between the outside atmosphere adjacent the safety cabinet 30 and the interior 59 of the enclosure 32 through each vent port 62, 64. In the illustrated embodiment, the lower vent port 62 on the left is configured to be an exhaust port that permits vapor from the bottom of the enclosure 32 to flow therefrom, and the upper vent port 64 on the right is configured to be a fresh air intake port that permits ambient air to enter the enclosure to make up for the exhaust stream flowing out of the enclosure 32 via the lower vent port 62.

Figure 6:
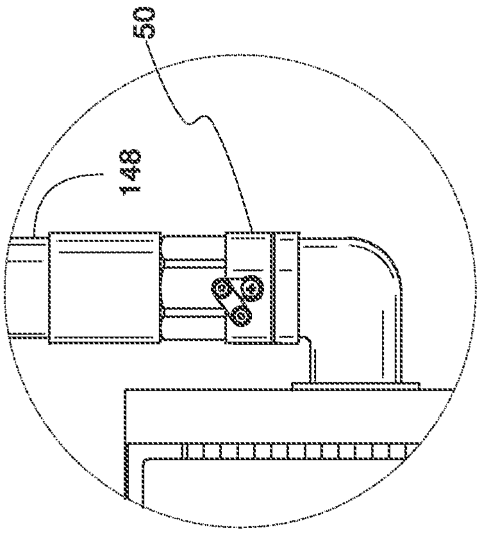
FIG. 6 is an enlarged detail view, taken from FIG. 1 as indicated by Circle VI, of an embodiment of a thermally-actuated damper constructed according to principles of the present disclosure.

In embodiments, the safety cabinet can be provided with vent bungs 65 (with removable bung caps) constructed to be placed in the vent ports 62, 64 (see FIG. 6) to facilitate the connection of the enclosure 32 to a respective conduit section 67 of the vent system 48. In embodiments, a pipe 67 (such as, one having a two-inch NPT thread, for example) can be connected to each vent bung 65 to facilitate the attachment of the respective conduit section (which can also comprise suitable ducting as will be appreciated by one skilled in the art).

Referring to FIG. 1, in embodiments, the safety cabinet 30 includes at least one door 38, 40 that is adapted to cover at least a portion of the opening of the enclosure 32 when in the closed position. Each door 38, 40 can be rotatably mounted to the enclosure 32 so that it is moveable over a range of travel between an open position and a closed position. In the illustrated embodiment, the safety cabinet 30 includes a pair of doors 38, 40 configured to cooperate together to occlude the opening 57 to the interior 59 of the enclosure 32 of the cabinet 30. In other embodiments, the safety cabinet 30 can include a single door that is configured to occlude the opening to the interior of the enclosure.

As best seen in FIGS. 1 and 2, the left and right doors 38, 40 selectively cover the opening 57 of the enclosure 32 and are respectively moveable over a range of travel between a closed position and a range of open positions. The left and right doors 38, 40 are adapted to cover the opening 57 of the enclosure 32 when in the closed position. The doors 38, 40 of the safety cabinet 30, which can have a double-walled construction to provide an insulative air space therebetween, can be placed in the closed position to help protect the contents stored therein from the harmful effects caused by an open flame and/or increased ambient temperature in the event of a fire.

Referring to FIG. 1, the left door 38 and the right door 40 are preferably rotatably mounted to the enclosure 32 by first and second hinges 68, 69, respectively. The first hinge 68 is mounted to the left jamb 53 of the enclosure 32 and to the left door 38. The second hinge 69 is mounted to the right jamb 54 of the enclosure 32 and to the right door 40. The first and second hinges 68, 69 both extend substantially the full height of the left and right doors 38, 40, respectively.

In some embodiments, the safety cabinet 30 can include means for automatically closing the doors. In embodiments, the safety cabinet 30 includes first and second actuators adapted to urge the first and second doors, respectively, to the closed position. Referring to FIG. 2, in the illustrated embodiment, first and second actuators in the form of air cylinders 71, 72 are attached to the left and right doors 38, 40, respectively, and to the enclosure 32. The air cylinders 71, 72 are adapted to bias the left and right doors 38, 40 to their closed positions.

While loading and unloading the safety cabinet 30, however, it may be desirable that the doors 38, 40 remain in an open position. In some embodiments, the safety cabinet 30 can include means for selectively retaining the doors 38, 40 in an open position. In the illustrative embodiment, first and second door retention mechanisms 73, 74 are respectively provided to selectively retain the doors 38, 40 in the open position, as shown in FIG. 2.

In some embodiments, each door retention mechanism 73, 74 includes a retaining element 77, 78 which is adapted to be selectively connected to a fusible link 79, 80 to hold the doors 38, 40 in an open position. The door retention mechanisms 73, 74 are mounted to the enclosure 32 and are selectively connected to the left and right door 38, 40, respectively. In some embodiments, the first and second retaining elements 77, 78 each has a detent feature that acts to selectively retain the respective door 38, 40, in the open position.

The fusible links 79, 80 of the retaining system 42 can be constructed to fuse, i.e., melt, when the ambient temperature reaches a certain level. When the doors 38, 40 are held open by the door retention mechanisms 77, 78, respectively, and the ambient temperature exceeds a threshold level, the links 79, 80 fuse, thereby releasing the doors 38, 40 and allowing the cylinders 71, 72 of the closure system 44 to move the doors 38, 40, respectively toward the closed position. In some embodiments, the fusible links 79, 80 are configured to fuse when the ambient temperature exceeds about 165° F.

In embodiments, the left door 38 includes an inner sealing flange 82, and the right door 40 includes an outer sealing flange 83. The sealing flanges 82, 83 extend along substantially the entire height of the door 38, 40 to which it is attached. Each sealing flange 82, 83 is adapted to extend from the respective door 38, 40 to which it is attached to a position in which it is in overlapping relationship with the other door 40, 38, respectively, when the doors 38, 40 are in the closed position.

In embodiments, to create a more effective seal, the inner and outer sealing flanges 82, 83 of the left and right doors 38, 40 are arranged such that the inner sealing flange 82 of the left door 38 is disposed in inward relationship to the right door 40, and the outer sealing flange 83 of the right door 40 is disposed in outer relationship to the left door 38. In embodiments, a suitable sequential door-closing system 90 can be provided that is adapted to coordinate the closure of the doors 38, 40 such that the left door 38 closes before the right door 40. In embodiments, any suitable sequential door-closing system 90 can be used, such as the sequential door-closing system shown in FIG. 2 and further described in U.S. Patent Application Publication No. US2013/0200767, for example. In other embodiments, a sequential door-closing system constructed according to principles described in U.S. Pat. No. 6,729,701 can be used.

When the doors 38, 40 are closed in a sequence wherein the left door 38 is in the closed position prior to the right door 40 being in a closed position, and, thereafter, the right door 40 moves to the closed position, the sealing flanges 82, 83 cooperate to form an effective seal between the doors 38, 40 to further protect the contents stored within the safety cabinet 30 from the outside environment. When sealed in this manner, flame and high temperature ambient air can be further inhibited from entering the enclosure 32 of safety cabinet 30.

In embodiments, the safety cabinet 30 can include any suitable latch system 46 adapted to help retain the doors 38, 40 in the closed position. In embodiments, the latch system 46 can be a three-point latch system having various configurations, including a slam-latch style that need not be operated in order to permit the doors 38, 40 to move from an open position to the closed position.

Figure 5:
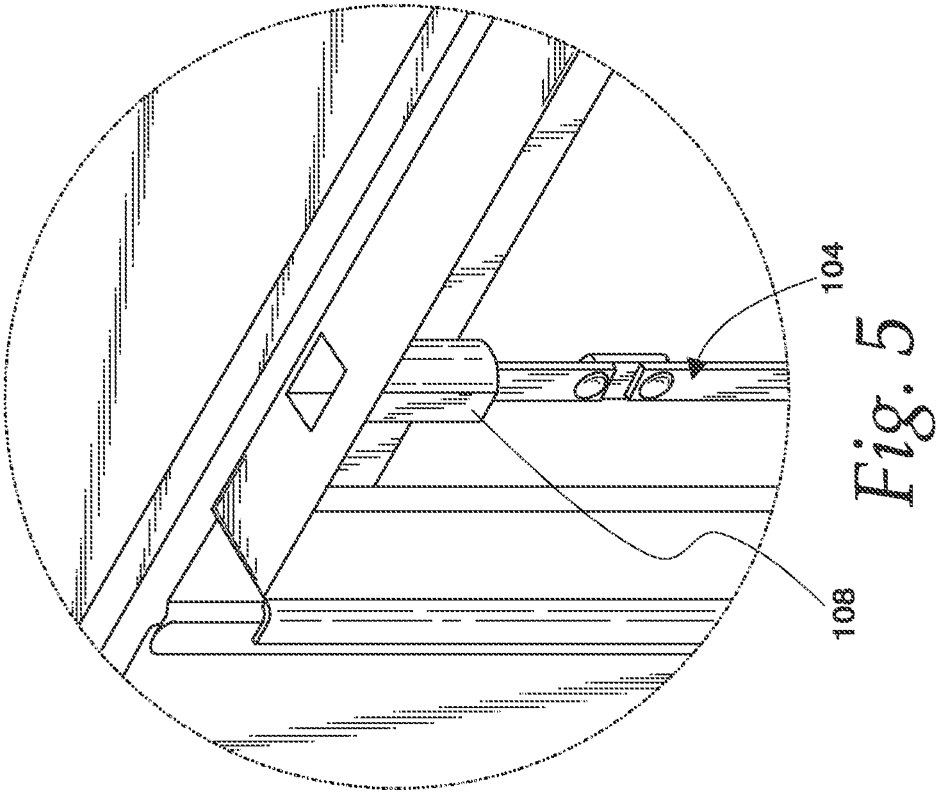
FIG. 5 is an enlarged detail view, taken from FIG. 4 as indicated by Circle V.
Figure 4:
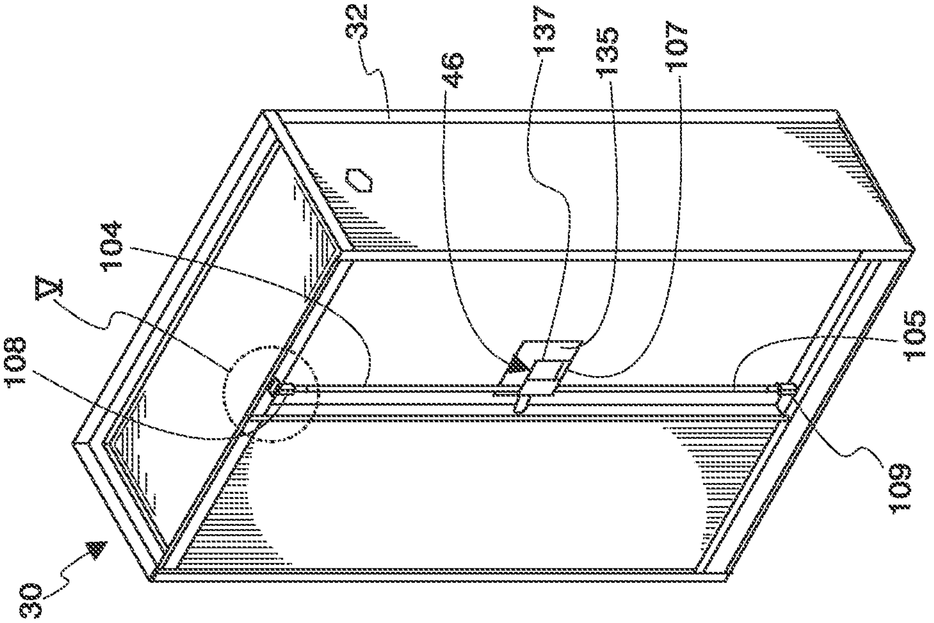
FIG. 4 is a perspective view of the safety cabinet of FIG. 1, illustrating a right door with an outer panel removed therefrom for illustrative purposes.

Referring to FIGS. 3-5, in embodiments, the latch system 46 includes a bullet slam latch 102, first and second latch rod assemblies 104, 105, and a paddle handle 107 (see also, FIG. 1). In the illustrated embodiment, the first and second latch rod assemblies 104, 105 each includes a distal bullet slam latch 108, 109 as described in U.S. Pat. No. 9,630,036. The paddle handle 107 is adapted to selectively actuate the latch system 46 to move the distal ends 108, 109 of the latch rod assemblies 104, 105 and the bullet slam latch 102 from an extended position to a retracted position in which the doors 38, 40 can be moved from the closed position to one of a range of open positions.

Actuating the paddle handle 107 moves the latch rod assemblies 104, 105 toward each other in opposing latch rod retracting directions which in turn moves the distal bullet slam latches 108, 109 to retracted positions. Actuating the paddle handle 107 also moves the bullet slam latch 102 in a slam latch retracting direction to a retracted position. The bullet slam latch 102 and the first and second latch rod assemblies 104, 105 are adapted to bias the latch members to extended positions but also to permit the latch members to move from the extended positions to respective retracted positions in response to the door 40 moving from an open position to the closed position (in other words, when it is "slammed" closed).

Referring to FIGS. 3 and 4, for ready access to the latch system 46 for maintenance, for example, the inner panel of the right door 40 includes an access hole 135 covered by a removable cover plate 137. The access hole 135 is disposed such that the paddle handle 107, the proximal ends of the latch rod assemblies 104, 105, and the bullet slam latch 102 are readily accessible through the hole 135. The latch system 46, including the bullet slam latch 102 and the latch rod assemblies 104, 105, for example, can be similar in construction, operation, and other respects to one described in U.S. Pat. No. 9,630,036, which is incorporated herein by this reference. In other embodiments, the latch system 46 can have a different arrangement, as will be appreciated by one skilled in the art. For example, in other embodiments, the latch system 46 can have a construction according to principles shown and described in U.S. Pat. No. 6,729,701, which is incorporated herein by this reference.

Referring to FIG. 1, in the illustrated embodiment, the safety cabinet 30 includes the vent system 48 which is vented to the outdoors in such a manner that the ability of the safety cabinet 30 to meet the ten-minute fire test performance rating using the standard time-temperature curve as set forth in Standard Methods of Fire Tests of Building Construction and Materials, NFPA 251-1969, which is incorporated by reference, as specified in § 1910.106 is not adversely affected. In embodiments, the vent system 48 can be used to adhere to the requirements in some jurisdictions that the safety cabinet 30 be vented to prevent vapor accumulation in the cabinet and to expel toxic or noxious fumes emitted from the contents stored within the safety cabinet 30.

In embodiments, the vent system 48 is mounted to the enclosure 32 such that the vent system 48 is in communication with at least one vent port 62, 64 of the enclosure 32. In embodiments, the vent system 48 includes a conduit 145 having an internal passage 147 and a thermally-actuated damper 50. The conduit 145 is connected to the enclosure 32 such that the internal passage 147 of the conduit 145 is in communication with the vent port 62 of the enclosure 32.

In the illustrated embodiment, the vent system 48 includes a first conduit 145 in communication with the lower vent port 62, a second conduit 148 in communication with the upper vent port 64, the first and second dampers 50 associated with the first and second conduits 145, 148, respectively, and an exhaust fan 149 in communication with the first conduit 145. In embodiments, each vent port 62, 64 can be equipped with a suitable flash arrestor screen as are known to those skilled in the art. In the illustrated embodiment, the lower vent port 62 acts as an exhaust outlet through which air inside the interior of the enclosure 32 is drawn, and the upper vent port 64 acts as a fresh air inlet through which ambient air outside the safety cabinet 30 is delivered into the enclosure 32 of the safety cabinet 30.

In embodiments, the exhaust fan 149 can be any suitable fan adapted to draw air from the interior of the enclosure 32 of the safety cabinet 30 through the first conduit 145. In embodiments, the exhaust fan 149 includes a non-sparking fan blade and a non-sparking shroud. In embodiments, the exhaust fan 149 is arranged so that air from the interior of the safety cabinet 30 is exhausted directly outside of the structure within which the safety cabinet 30 is disposed.

In the illustrated embodiment, the thermally-actuated dampers 50 have substantially the same construction and operate in a similar manner. Each damper 50 is disposed within a respective conduit 145, 148 to form part of the internal passage 147 (see FIG. 7).

Each thermally-actuated damper 50 is adapted to be in an open position (see FIG. 20) under normal ambient temperature conditions to permit the vent system 48 to act to draw air from the interior of the enclosure out through the first conduit 145 and to convey fresh intake air into the enclosure 32 through the second conduit. Each thermally-actuated damper 50 is adapted to move to a closed position (see FIG. 24) when the temperature to which it is subjected exceeds a predetermined threshold such that the conduit within which the thermally-actuated damper 50 is occluded, thereby substantially preventing airflow from or into the enclosure 32 via the vent ports 62, 64.

Figure 8:
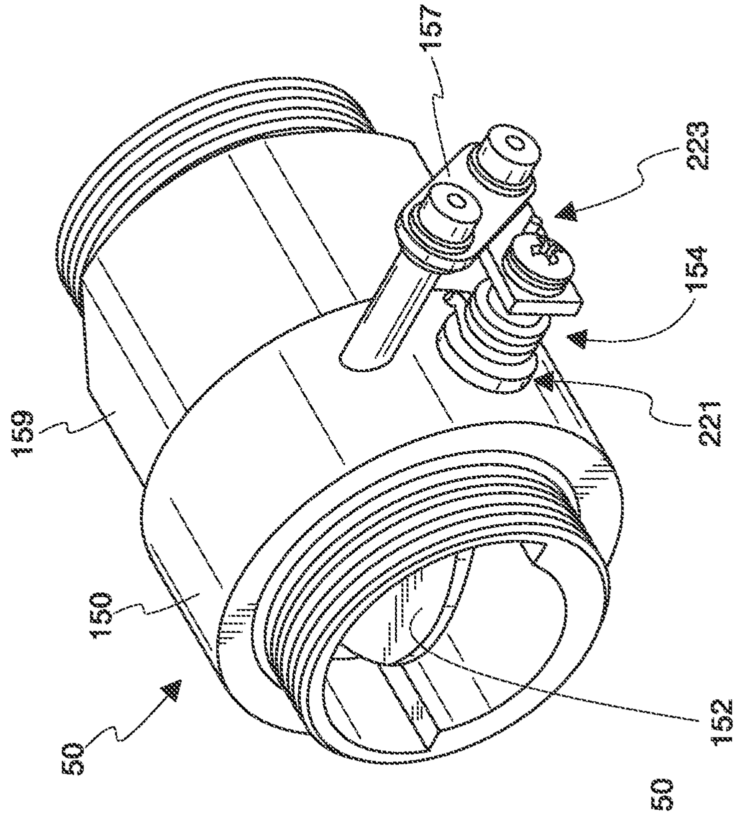
FIG. 8 is a perspective view of an embodiment of a thermally-actuated damper constructed according to principles of the present disclosure.
Figure 9:
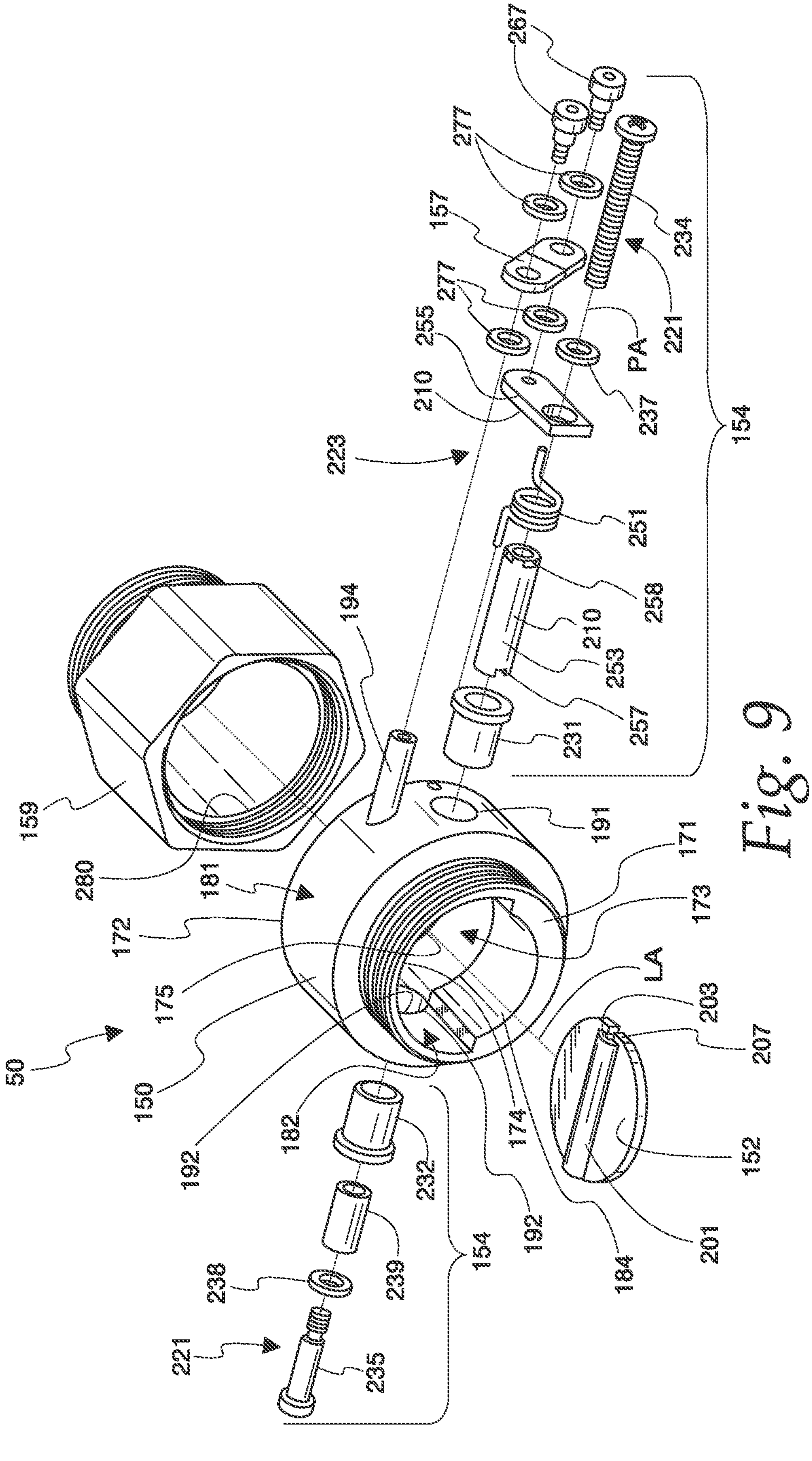
FIG. 9 is an exploded view of the thermally-actuated damper of FIG. 8.

FIGS. 8-26 show one of the thermally-actuated dampers 50 (or a component thereof) of the safety cabinet 30 of FIG. 1. It should be understood that the description of this thermally-actuated damper 50 is applicable to the other thermally-actuated dampers 50, as well. Referring to FIGS. 8 and 9, in embodiments, the thermally-actuated damper 50 includes a body 150, a valve plate 152, and a pivot assembly 154. In the illustrated embodiment, the thermally-actuated damper 50 includes the body 150, the valve plate 152, the pivot assembly 154 having a fusible link 157, and a coupling 159.

In embodiments, any suitable technique can be used to fabricate the components of the damper 50, as will be appreciated by one skilled in the art. In embodiments, the components of the damper 50 can be produced using known machining techniques, including Computer Numerical Control (CNC) machining, or using a combination of castings and machined parts. In embodiments, other than positioning the valve plate 152 on the valve seat of the body 150, assembly of the damper 50 can be performed from the outside of the housing body 150.

Figure 7:
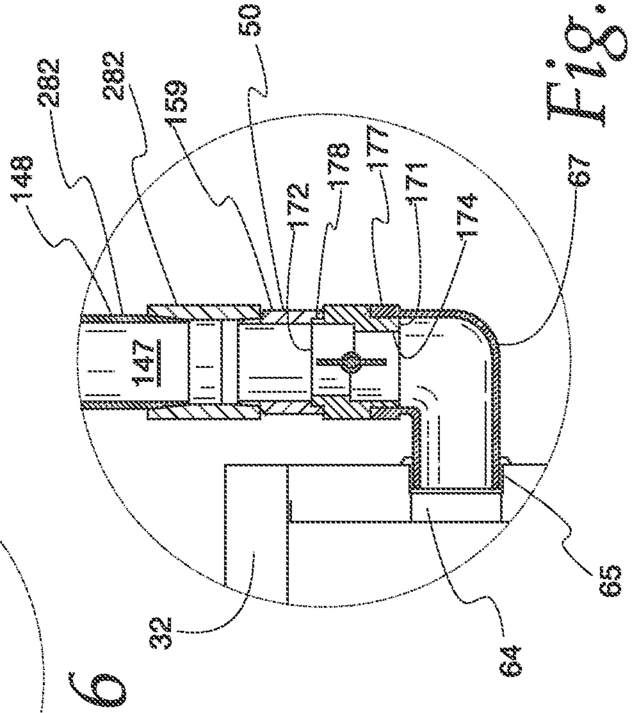
FIG. 7 is a view as in FIG. 6, but in section.

Referring to FIG. 9, the body 150 extends along a longitudinal axis LA and has a first end 171 and a second end 172. The ends 171, 172 are disposed in spaced relationship to each other along the longitudinal axis LA. The body 150 defines an internal passage 173 with a first opening 174 disposed at the first end 171 and a second opening 175 disposed at the second end 172 (see also, FIG. 20). Referring to FIG. 7, the body 150 comprises a portion of the conduit 148 such that the opening 174 of the first end 171 of the body 150 is in communication with the upper vent port 64 of the enclosure 32.

Figure 20:
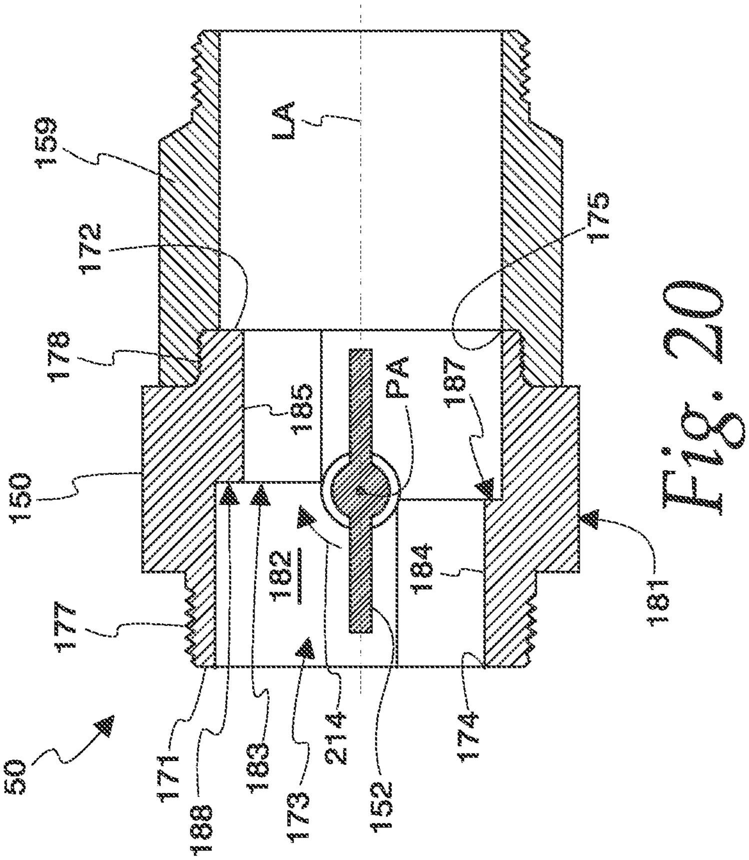
FIG. 20 is a cross-sectional view, taken along line XX-XX in FIG. 17, of the thermally-actuated damper of FIG. 8.

Referring to FIGS. 7 and 20, in embodiments, at least one of the first and second ends 171, 172 of the body 150 each includes a threaded surface 178 which is configured to threadingly mate with a suitable pipe section, such as a coupling 159, for example. In the illustrated embodiment, both the first and second ends 171, 172 of the body 150 include a threaded surface 177, 178, which in the illustrated embodiment both comprise an external threaded surface. In other embodiments, the body 150 can include at least one internal threaded surface disposed adjacent at least one of its first and second ends 171, 172.

Figure 23:
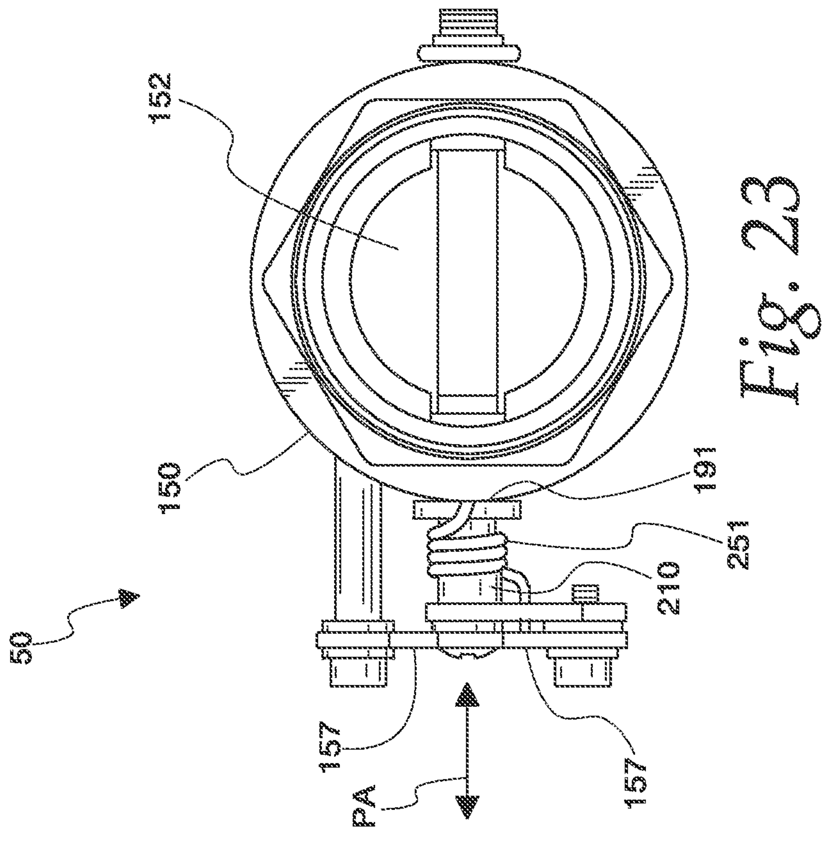
FIG. 23 is a view as in FIG. 19, but illustrating the thermally-actuated damper in a closed position.
Figure 26:
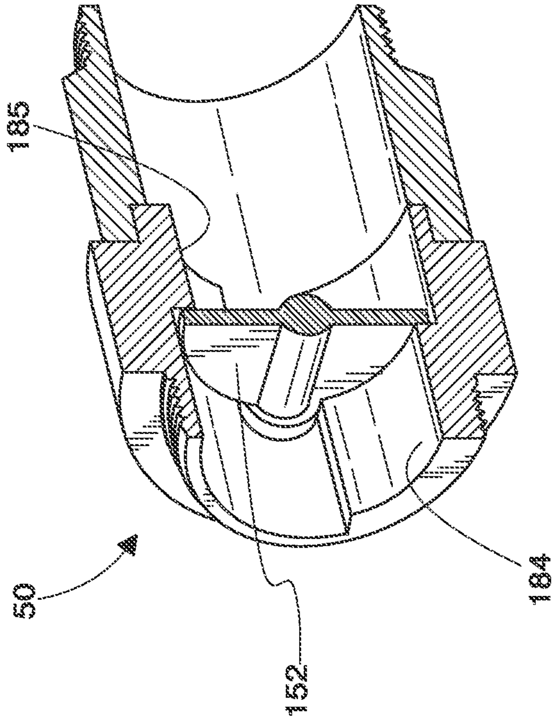
FIG. 26 is the cross-sectional view of FIG. 24, but in perspective.
Figure 25:
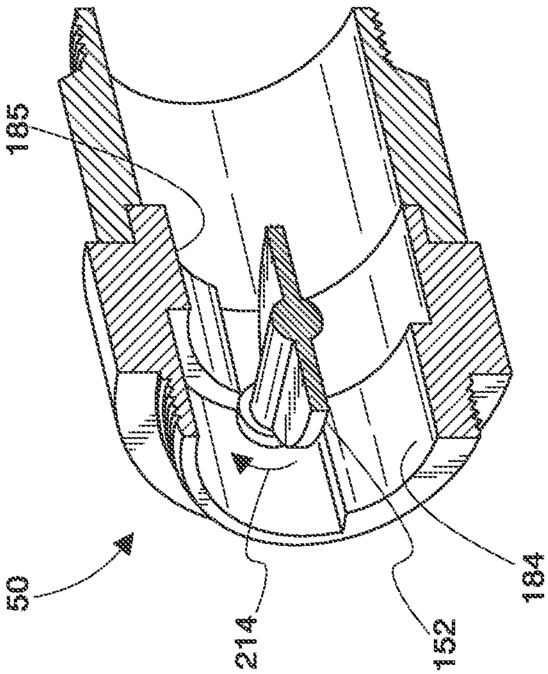
FIG. 25 is the cross-sectional view of FIG. 23, but in perspective.

Referring to FIG. 23, the body 150 of the damper includes an exterior surface 181 and an interior surface 182. The interior surface 182 is generally cylindrical and defines the passage 173 thereof. The exterior surface 181 is in outer radial circumscribing relationship to the interior surface 182.

In embodiments, the body 150 defines a suitable valve seat 183 for sealing engagement with the valve plate 152. In the illustrated embodiment, the interior surface 182 has a first projection 184 and a second projection 185 that define the valve seat 183. The first and second projections 184, 185 are in opposing relationship to each other such that they extend radially inward toward each other. The first projection 184 is disposed adjacent the first end 171 of the body 150 and includes a first valve seat surface 187 extending radially inwardly and facing the second end 172 of the body 150, and the second projection 185 includes a second valve seat surface 188 extending radially inwardly and facing the first end 171 of the body 150. The first and second projections 184, 185 are similar in shape and size and comprise arcuate segments (see, e.g., FIG. 9).

Figure 24:
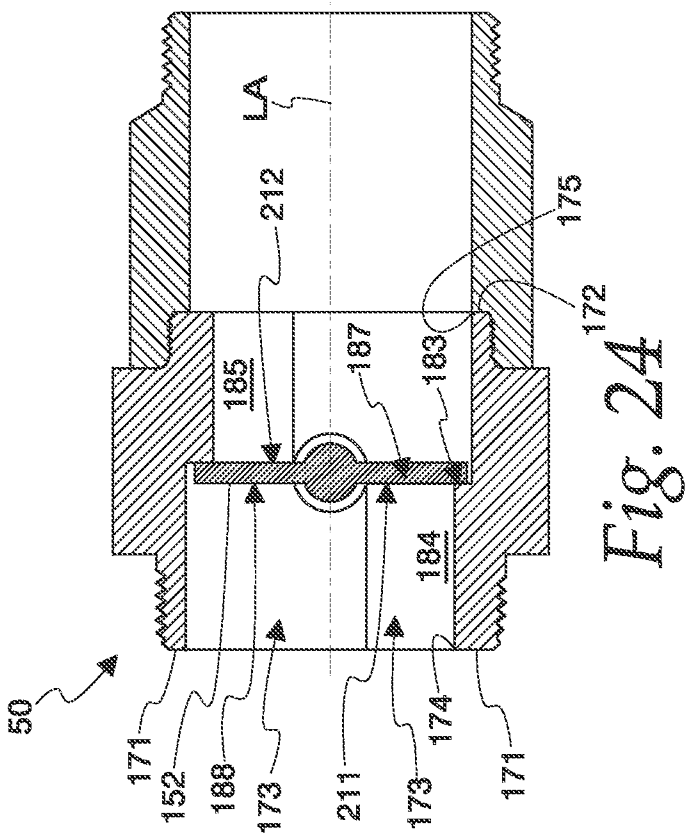
FIG. 24 is a cross-sectional view, taken along line XXIV-XXIV in FIG. 21, of the thermally-actuated damper of FIG. 8.

Referring to FIG. 24, the valve seat 183 comprises the first and second valve seat surface 187, 188. In the illustrated embodiment, the first and second valve seat surface are disposed in offset relationship to each other along the longitudinal axis LA in an amount substantially equal to the thickness of the valve plate 152.

Referring to FIG. 9, in embodiments, the body 150 defines a cross bore 191 that extends radially from the exterior surface 181 to the interior surface 182. The cross bore 191 can be configured to accommodate the access of the pivot assembly 154 to the valve plate 152. In the illustrated embodiment, the body 150 defines a pair of cross bores 191, 192. The cross bores 191, 192 are in opposing relationship to each other and both extend radially from the exterior surface 181 to the interior surface 182.

In the illustrated embodiment, the body 150 includes a link anchor post 194 configured to secure the fusible link 157 thereto. The link anchor post 194 projects outwardly from the body 150.

Figure 11:
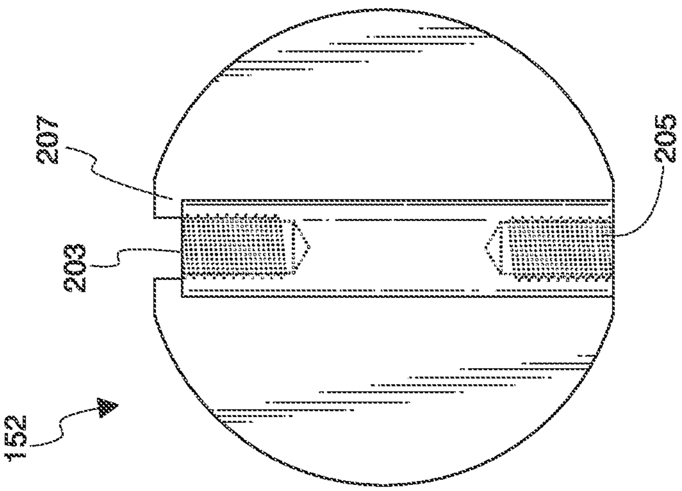
FIG. 11 is a face view of the valve plate of FIG. 10.
Figure 10:
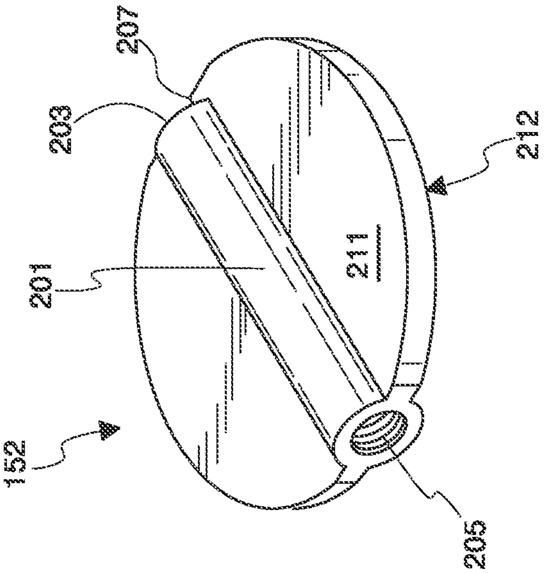
FIG. 10 is a perspective view of a valve plate of the thermally-actuated damper of FIG. 8.

Referring to FIGS. 9-11, the valve plate 152 comprises a substantially flat circular disc configured to selectively occlude the passage 137 of the body 150. The valve plate 152 includes a central rib 201 that defines first and second threaded bores 203, 205 therein that are configured to threadingly engage portions of the pivot assembly 154 to facilitate the rotational movement of the valve plate 152 between an open position and a closed position. The valve plate includes a drive member engagement portion 207 coinciding with the first threaded bore 203. The engagement portion 207 is configured to be rotatively coupled with a drive member 210 of the pivot assembly 154 to permit the pivot assembly 154 to selectively rotate the valve plate 152 with respect to the body 150.

Referring to FIGS. 20 and 24, the valve plate 152 is disposed within the passage 173 of the body 150 such that the valve plate 152 is intermediately disposed along the longitudinal axis LA between the first end 171 and the second end 172 of the body 150. The valve plate 152 is movable between an open position (as shown in FIG. 20) and a closed position (as shown in FIG. 24). The valve plate 152 permits air flow between the openings 174, 175 of the passage 173 of the body 150 when the valve plate 152 is in the open position, and the valve plate 152 substantially occludes the passage 173 of the body 150 when the valve plate 152 is in the closed position to substantially prevent air flow between the openings 174, 175 of the passage.

In the illustrated embodiment, the valve plate 152 is in contacting engagement with the first projection 184 and the second projection 185 when the valve plate 152 is in the closed position. The pivot assembly 154 is operable to pivot the valve plate 152 about a pivot axis PA in a closing direction 214 from the open position in FIG. 20 to the closed position in FIG. 24. The valve plate 152 includes a first face 211 and a second face 212 in opposing relationship to the first face 211 (see also FIG. 10). The first and second faces 211, 212 are both circular and are substantially the same size. The first and second valve seat surfaces 187, 188 are configured to interferingly engage the first and second faces 211, 212 of the valve plate 152, respectively, to prevent the valve plate 152 from rotating further about the pivot axis PA in the closing direction 214.

Referring to FIG. 9, the pivot assembly 154 is adapted to selectively move the valve plate 152 from the open position to the closed position in the event that the ambient thermal conditions of the damper 50 exceed a threshold level. The pivot assembly 154 can be connected to the body 150 and the valve plate 152. The illustrated pivot assembly 154 includes a valve support assembly 221, a biasing system 223, and the fusible link 157.

In embodiments, the valve support assembly 221 is adapted to support the valve plate 152 such that the valve plate 152 is movable between the open position and the closed position. In the illustrated embodiment, the valve support assembly 221 is adapted to support the valve plate 152 such that the valve plate 152 is rotatably movable about the pivot axis PA between the open position and the closed position. In embodiments, the valve support assembly 221 is mounted to the body 150 and the valve plate 152.

In the illustrated embodiment, the valve support assembly 221 includes a pair of bushings 231, 232, a pair of trunnion members 234, 235, a pair of washers 237, 238, and a support sleeve 239. The bushings are respectively disposed at least partially within the cross bores of the body 150. In embodiments, the bushings 231, 232 can be made from any suitable material. For example, in embodiments, the bushings 231, 232 can be made from a material that inhibits the production of electrical sparks from friction caused by relatively moving parts. In embodiments, the bushings 231, 232 are made from a suitable brass.

Figure 17:
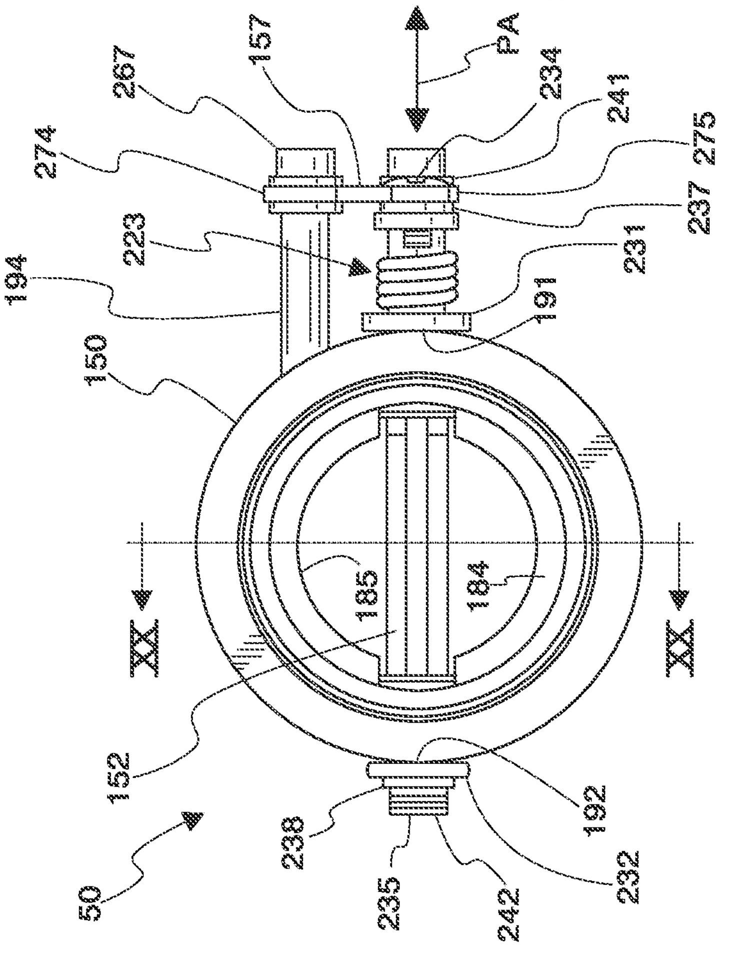
FIG. 17 is a first end elevational view of the thermally-actuated damper of FIG. 8, illustrating the thermally-actuated damper in an open position.
Figure 21:
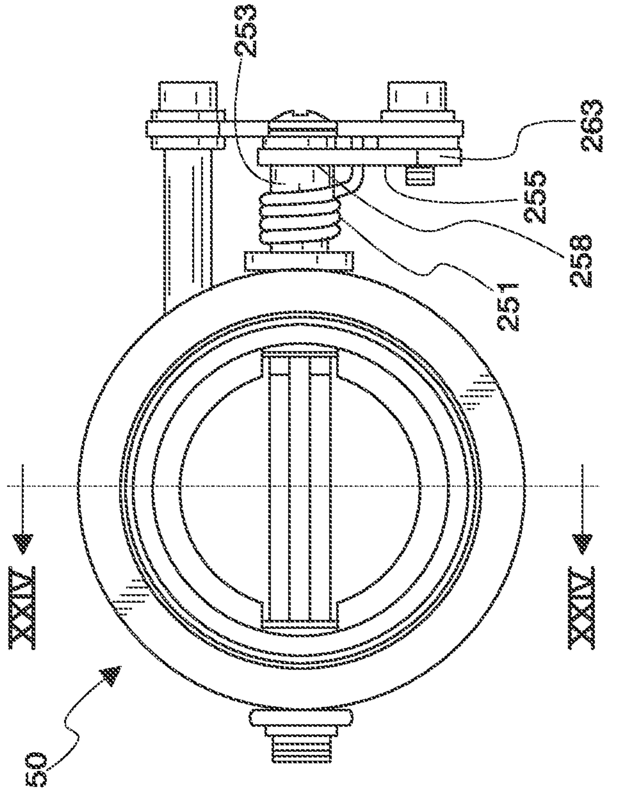
FIG. 21 is a view as in FIG. 17, but illustrating the thermally-actuated damper in a closed position.

Referring to FIGS. 17 and 21, the trunnion members 234, 235 are connected to the valve plate 152 such that the trunnion members 234, 235 extend, respectively, from the valve plate 152 into the cross bores 191, 192 of the body 150. The trunnion members 234, 235 and the valve plate 152 are pivotable about the pivot axis PA with respect to the body 150. The trunnion members 234, 235 each include a distal end 241, 242. The trunnion members 234, 235 extend, respectively, from the valve plate 152 into the bushings 231, 232 such that the distal ends 241, 242 of the trunnion members 231, 232 are disposed laterally outward of the bushings 231, 232 with a respective one of the washers 237, 28 interposed therebetween. The trunnion members 234, 235 extend through the bushings 231, 232, respectively, such that the distal end 241, 242 of each trunnion member 234, 235 is disposed in outer relationship to the respective bushing 231, 232 such that the distal ends 241, 242 of the trunnion members 231, 232 provide a captured connection between the valve plate 152 and the body 150.

In the illustrated embodiment, the valve support assembly 221 is adapted to support the valve plate 152 such that the valve plate 152 is rotatably movable about the pivot axis PA between the open position and the closed position. The valve plate 152 rotates about the pivot axis PA in the closing direction 214 when moving from the open position to the closed position. In embodiments, at least one of the first and second projections 184, 185 of the body 150 is configured such that said at least one of the first and second projections 184, 185 defines the location of the closed position by being configured to interferingly engage the valve plate 152 to prevent the valve plate 152 from rotating from the open position further about the pivot axis PA in the closing direction 214 (see also, FIGS. 25 and 26).

Referring to FIG. 8, the biasing system 223 is adapted to bias the valve plate 152 to the closed position. In embodiments, the biasing system 223 is mounted to the body 150 such that it acts upon the valve plate 152 and is adapted to bias the valve plate 152 to the closed position. In embodiments, the biasing system 223 is mounted to the body 150 and at least one of the valve plate 152 and the valve support assembly 221.

Figure 18:
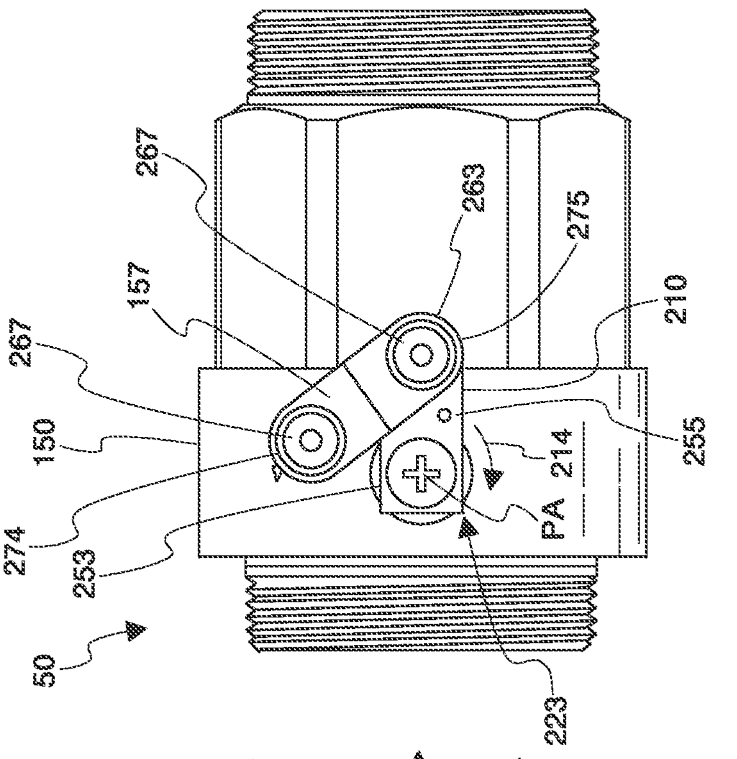
FIG. 18 is a first elevational view of the thermally-actuated damper of FIG. 8, illustrating the thermally-actuated damper in an open position.
Figure 19:
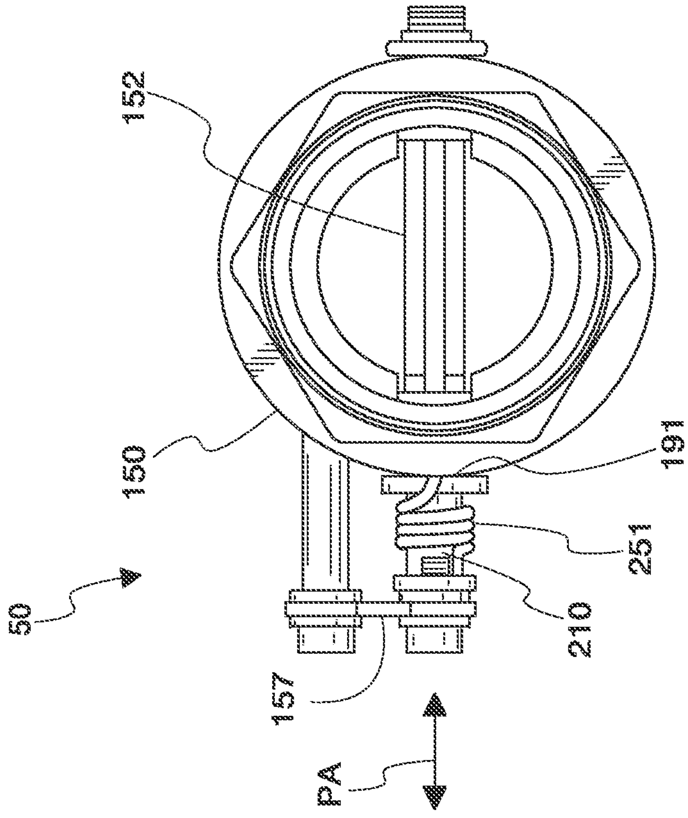
FIG. 19 is a second end elevational view of the thermally-actuated damper of FIG. 8, illustrating the thermally-actuated damper in an open position.

Referring to FIG. 9, in the illustrated embodiment, the biasing system 223 includes the drive member 210 and a spring 251. Referring to FIGS. 19 and 23, the drive member 210 defines the pivot axis PA. The drive member 210 extends through the first cross bore 191 of the body 150 (see also, FIG. 9). The drive member 210 is coupled to the valve plate 152 such that rotational movement of the drive member 210 about the pivot axis PA correspondingly rotates the valve plate 152. The spring 251 is mounted to the body 150 and to the drive member 210 such that the spring 251 exerts a spring force against the drive member 210 configured to rotate the drive member 210 about the pivot axis PA in the closing direction 214 when the fusible link 157 melts to move the valve plate 152 from the open position to the closed position (see also, FIGS. 18 and 22).

Referring to FIG. 9, in the illustrated embodiment, the drive member 210 of the damper 50 comprises a drive sleeve 253 and a pivot arm 255. The drive sleeve 253 extends along the pivot axis PA through one of the cross bores 191 of the body 150. Referring to FIGS. 9 and 12-14, the drive sleeve 253 includes an inner end 257 and an outer end 258. The inner end 257 of the drive sleeve 253 is coupled to the valve plate 152 such that rotational movement of the drive member 210 about the pivot axis PA correspondingly rotates the valve plate 152. In the illustrated embodiment, the inner end 257 comprises a valve plate socket that is configured to engagingly receive the engagement portion 207 of the valve plate 152. The outer end 258 of the drive sleeve 253 is disposed in outer relationship to the exterior surface 181 of the body 150.

Figures 12, 13, 14, 15, 16:
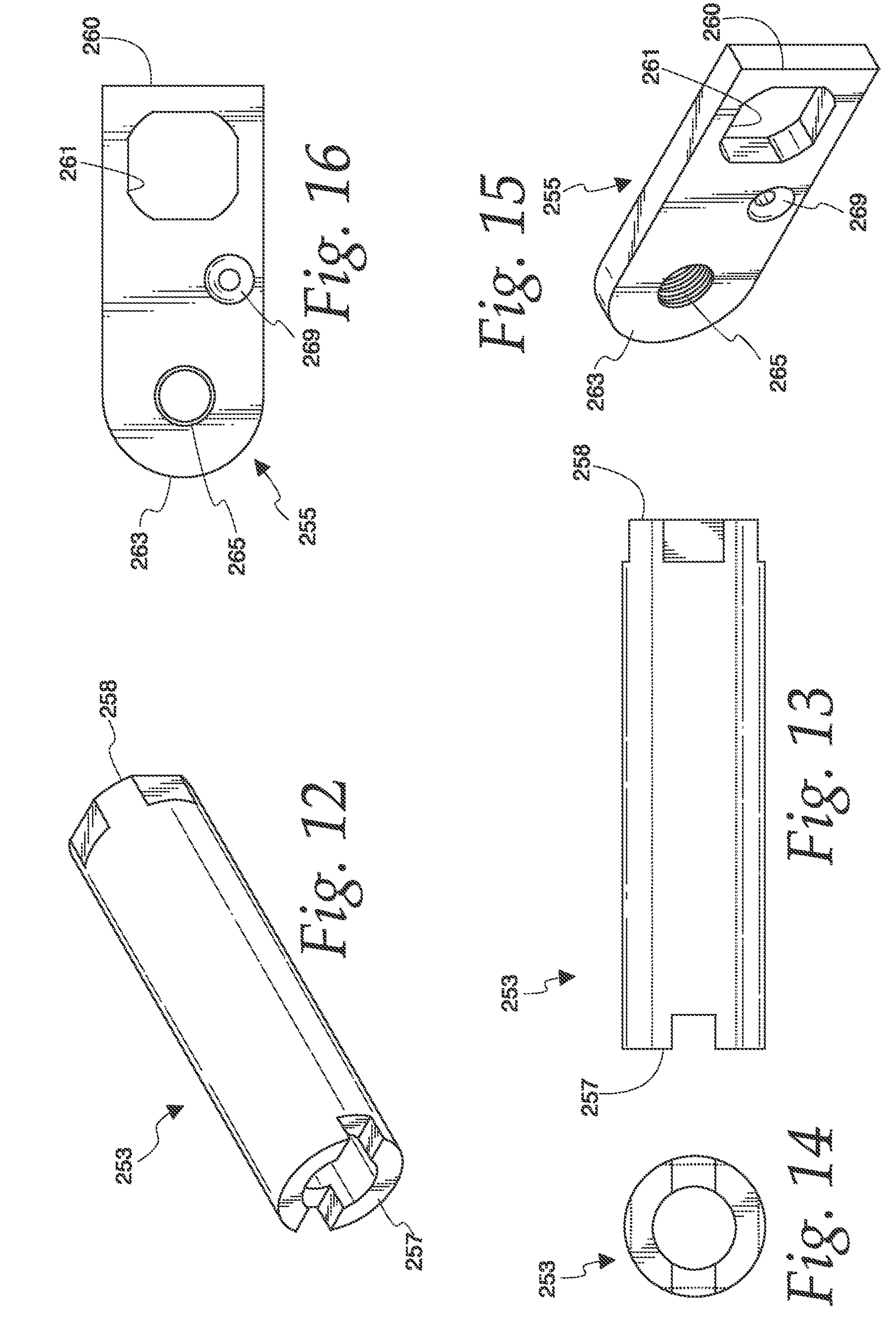
FIG. 12 is a perspective view of a drive rod of the thermally-actuated damper of FIG. 8.
FIG. 13 is a side elevational view of the drive rod of FIG. 12.
FIG. 14 is an end elevational view of the drive rod of FIG. 12.
FIG. 15 is a perspective view of a pivot arm of the thermally-actuated damper of FIG. 8.
FIG. 16 is a side elevational view of the pivot arm of FIG. 15.

Referring to FIGS. 15 and 16, the pivot arm 255 includes a proximal end 260 that defines a generally square-shaped opening 261 that is configured to engagingly receive the outer end 258 of the drive sleeve 253 therein. The pivot arm 255 includes a distal end 263 that defines a mounting hole 265 therethrough that is configured to threadingly receive a link fastener 267 therein (see also, FIG. 9) to help secure the link 157 to the biasing system 223. The pivot arm 255 also defines a spring mounting hole 269 therein that is configured to retain therein an end of the spring 251. In the illustrated embodiment, the spring mounting hole has a chamfered (or frustoconical) shape to help facilitate the insertion of the end of the spring 251 therein. Referring to FIGS. 18 and 21, the pivot arm 255 is mounted to the drive sleeve 253 adjacent the outer end 258 thereof such that the distal end 263 of the pivot arm 255 projects from the drive sleeve 253.

Figure 22:
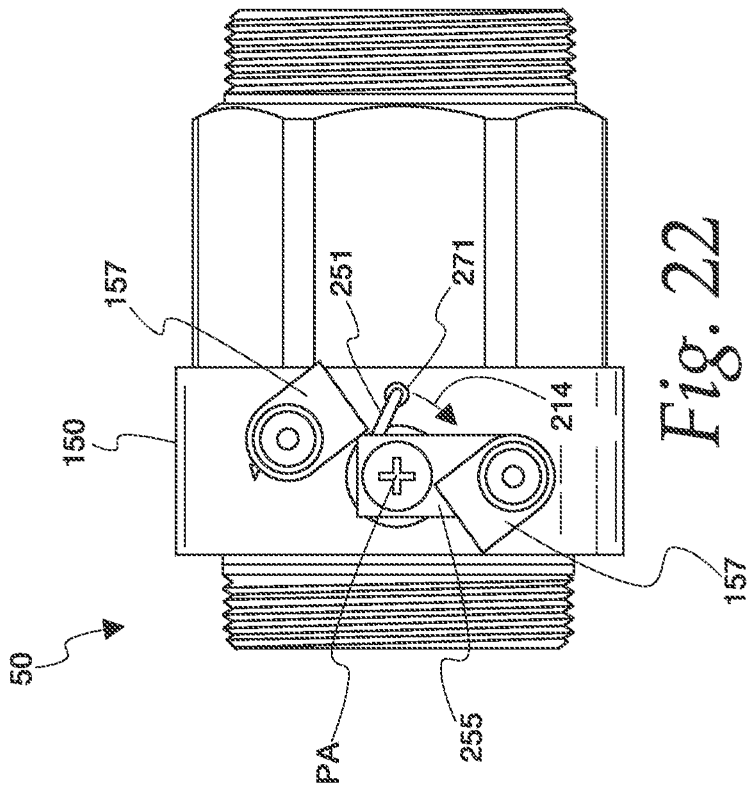
FIG. 22 is a view as in FIG. 18, but illustrating the thermally-actuated damper in a closed position.

Referring to FIG. 21, the spring 251 is connected to the pivot arm 255 via the spring mounting hole defined through the pivot arm 255. Referring to FIG. 22, in the illustrated embodiment, the body 150 defines a second spring mounting 271 hole therein to retentively receive therein the other end of the spring 251. In embodiments, the spring 251 is mounted to the body 150 and to the pivot arm 255 such that the spring 251 exerts a spring force against the drive sleeve 253 configured to rotate the drive member 210 about the pivot axis PA in the closing direction 214 to move the valve plate 152 from the open position to the closed position.

Referring to FIGS. 17 and 18, the fusible link 157 is interconnected between the body 150 and the biasing system 223 to form an interconnection therebetween such that the valve plate 152 is disposed in the open position. In embodiments, the fusible link 157 is retentively connected to the drive member 210 to constrain the rotational movement of the drive member 210 about the pivot axis PA such that the valve plate 152 is disposed in the open position. In the illustrated embodiment, the fusible link 157 is retentively connected to the body 150 and to the pivot arm 255 to constrain the rotational movement of the drive member 210 about the pivot axis PA such that the valve plate 152 is disposed in the open position.

The fusible link 157 constrains the valve plate 152 from moving from the open position to the closed position via the interconnection of the fusible link 157 between the body 150 and the biasing system 223. The fusible link 157 is configured to melt at a predetermined temperature to thereby disengage the interconnection of the fusible link 157 between the biasing system 223 and the body 150 and to thereby allow the biasing system 223 to move the valve plate 152 to the closed position.

In the illustrated embodiment, the fusible link 157 of the damper includes a first link end 274 and a second link end 275. The first link end 274 of the fusible link 157 is mounted to the link anchor post 194 via a fastener 267, and the second link end 275 of the fusible link 157 is mounted to the distal end 263 of the pivot arm 255 via a second fastener 267. Referring to FIG. 9, a pair of washers 277 can be associated with each link fastener 267 to help permit each end 274, 275 to be relatively rotatable with respect to the component to which it is connected. The washers 277 can be disposed on both sides of the link 157 such that the link is interposed between the pairs of washers 277.

Referring to FIGS. 9 and 20, the coupling 159 includes a mating threaded surface 280 that is configured to threadingly engage at least one of the threaded surfaces 178 of the first and second ends 171, 172 of the body 150 such that the coupling 159 is substantially aligned with the body 150 along the longitudinal axis LA thereof. Referring to FIG. 7, in embodiments, the coupling 159 comprises a portion of the conduit 148. In embodiments, the conduit 148 includes pipe sections 282 that are coupled to the coupling 159 of the damper 50. In embodiments, the pipe sections 282 can be made from a suitable plastic, such as PVC, for example. In embodiments, the pipe section 282 can be made from plastic rather than metal to provide a cost savings and to help facilitate the installation of the conduit 148.

The safety cabinet 30 can be similar in construction and functionality in other respects to a safety cabinet as shown and described in U.S. Pat. No. 6,729,701, which is incorporated in its entirety herein by this reference. For example, the other components of the latch system 46, the retaining system 42, and the closure system 44 can be similar to those shown and described in U.S. Pat. No. 6,729,701. In embodiments, the safety cabinet 30 can be similar in construction and functionality in other respects to a safety cabinet as shown and described in any of U.S. Pat. Nos. 8,172,344 and/or 9,630,036 and/or U.S. Patent Application Publication No. US2008/0106174 and/or US2013/0200767, which are all incorporated in their entireties herein by this reference.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and similar referents in the context of describing the present disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the present disclosure and does not pose a limitation on the scope of the present disclosure unless otherwise claimed. No language in the specification should be construed as indicating any non-claimed element as essential to the practice of the present disclosure.

Preferred embodiments of this present disclosure are described herein, including the best mode known to the inventors for carrying out the present disclosure. Of course, variations of those preferred embodiments will become apparent to those of ordinary skill in the art upon reading the foregoing description. The inventors expect skilled artisans to employ such variations as appropriate, and the inventors intend for the present disclosure to be practiced otherwise than as specifically described herein. Accordingly, this present disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A damper for a vent system of a safety cabinet, the damper comprising:

a body, the body extending along a longitudinal axis and having a first end and a second end, the ends disposed in spaced relationship to each other along the longitudinal axis, the body defining a passage with a first opening disposed at the first end and a second opening disposed at the second end;

a valve plate, the valve plate disposed within the passage of the body such that the valve plate is intermediately disposed along the longitudinal axis between the first end and the second end of the body, the valve plate being movable between an open position and a closed position, the valve plate permitting air flow between the openings of the passage of the body when the valve plate is in the open position, and the valve plate substantially occluding the passage of the body when the valve plate is in the closed position;

a pivot assembly, the pivot assembly including a valve support assembly, a biasing system, and a fusible link, the valve support assembly mounted to the body and the valve plate, the valve support assembly adapted to support the valve plate such that the valve plate is movable between the open position and the closed position, the biasing system mounted to the body and at least one of the valve plate and the valve support assembly, the biasing system adapted to bias the valve plate to the closed position, and the fusible link interconnected between the body and the biasing system to form an interconnection therebetween such that the valve plate is disposed in the open position, the fusible link constraining the valve plate from moving from the open position to the closed position via the interconnection of the fusible link between the body and the biasing system, and the fusible link being configured to melt at a predetermined temperature to thereby disengage the interconnection of the fusible link between the biasing system and the body and to thereby allow the biasing system to move the valve plate to the closed position;

wherein the body includes an exterior surface and an interior surface, the interior surface being generally cylindrical and defining the passage thereof, the exterior surface being in outer radial circumscribing relationship to the interior surface, the body defining a pair of cross bores, the cross bores being in opposing relationship to each other and each extending radially from the exterior surface to the interior surface, and wherein the valve support assembly includes a pair of trunnion members, the trunnion members being connected to the valve plate such that the trunnion members extend, respectively, from the valve plate into the cross bores, the trunnion members and the valve plate being pivotable about a pivot axis with respect to the body;

wherein the biasing system includes a drive sleeve, a pivot arm, and a spring, the drive sleeve extending along the pivot axis through one of the cross bores of the body, the drive sleeve including an inner end and an outer end, the inner end of the drive sleeve coupled to the valve plate such that rotational movement of the drive sleeve about the pivot axis correspondingly rotates the valve plate, the outer end of the drive sleeve being disposed in outer relationship to the exterior surface of the body, the pivot arm being mounted to the drive sleeve adjacent the outer end thereof such that a distal end of the pivot arm projects from the drive sleeve, the spring being mounted to the body and to the pivot arm such that the spring exerts a spring force against the drive sleeve configured to rotate the drive sleeve about the pivot axis in a closing direction to move the valve plate from the open position to the closed position, the fusible link retentively connected to the body and to the pivot arm to constrain the rotational movement of the drive sleeve about the pivot axis such that the valve plate is disposed in the open position;

wherein the interior surface of the body includes a first projection and a second projection, the first and second projections extending radially inwardly toward each other, and the valve plate being in contacting engagement with the first projection and the second projection when the valve plate is in the closed position, the valve support assembly being adapted to support the valve plate such that the valve plate is rotatably movable about the pivot axis between the open position and the closed position, the valve plate rotating about the pivot axis in a closing direction when moving from the open position to the closed position, the first projection includes a first valve seat surface extending radially inwardly and facing the second end of the body, and the second projection includes a second valve seat surface extending radially inwardly and facing the first end of the body, wherein the valve plate includes a first face and a second face in opposing relationship to the first face, the first and second valve seat surfaces being configured to interferingly engage the first and second faces of the valve plate, respectively, when the valve plate is in the closed position to prevent the valve plate from rotating from the open position further about the pivot axis in the closing direction.

2. The damper of claim 1, wherein the first and second ends of the body each includes a threaded surface, the damper further comprising:

a coupling, the coupling including a mating threaded surface, the mating threaded surface configured to threadingly engage at least one of the threaded surfaces of the first and second ends of the body such that the coupling is substantially aligned with the body along the longitudinal axis thereof.

3. The damper of claim 1, wherein the fusible link includes a first link end and a second link end, and wherein the body includes a link anchor post, the link anchor post projecting outwardly from the body, the first link end of the fusible link being mounted to the link anchor post, and the second link end of the fusible link being mounted to the distal end of the pivot arm.

4. The damper of claim 1, wherein the valve support assembly includes a pair of bushings, the bushings being respectively disposed at least partially within the cross bores of the body, the trunnion members extending, respectively, from the valve plate into the bushings.

5. The damper of claim 4, wherein the trunnion members each include a distal end, the trunnion members extending through the bushings such that the distal end of each trunnion member is disposed in outer relationship to the respective bushing such that the distal ends of the trunnion members provide a captured connection between the valve plate and the body.

6. The damper of claim 5, wherein the fusible link includes a first link end and a second link end, and wherein the body includes a link anchor post, the link anchor post projecting outwardly from the body, the first link end of the fusible link being mounted to the link anchor post, and the second link end of the fusible link being mounted to the distal end of the pivot arm.

* * * * *